Figure 1:
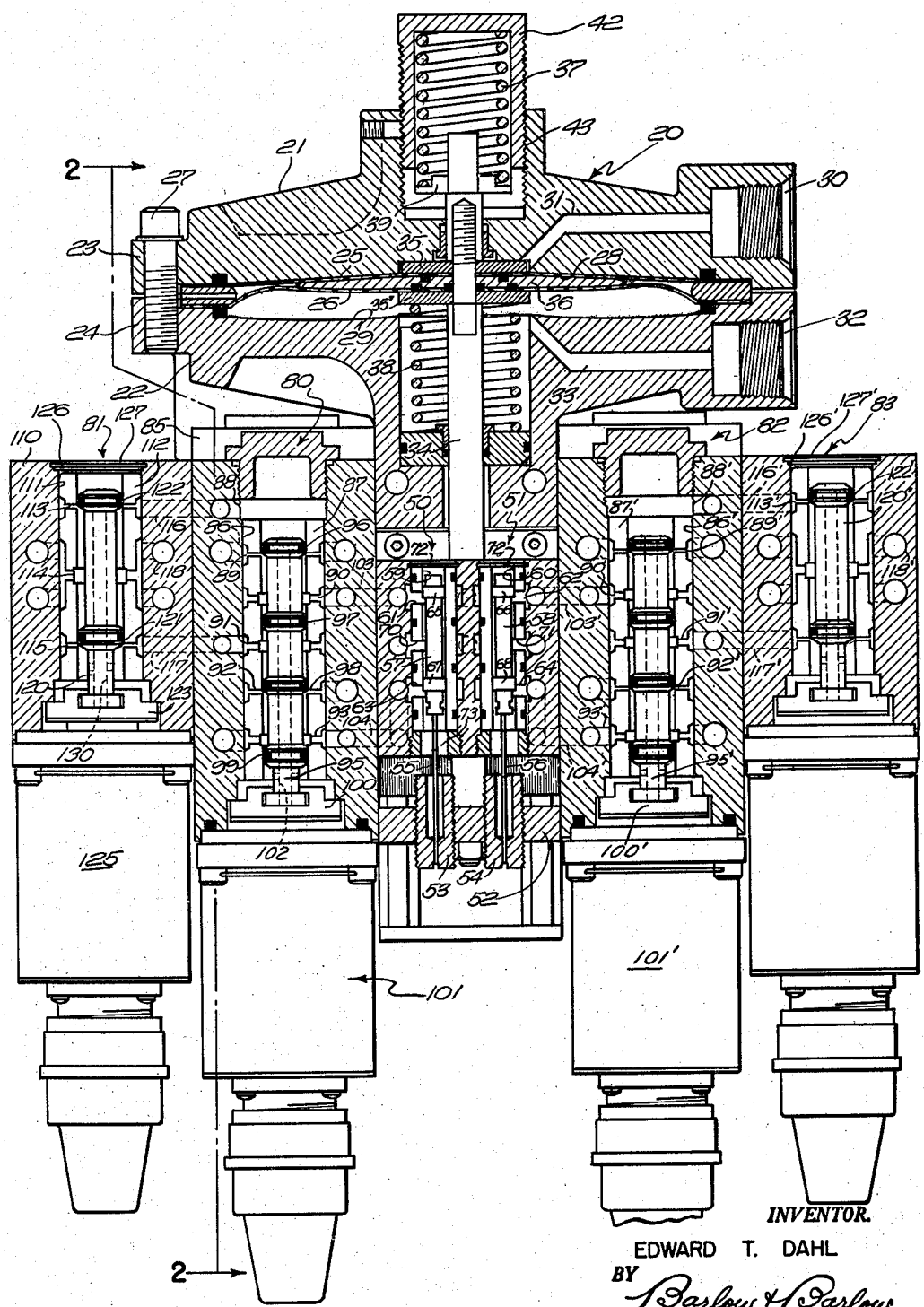

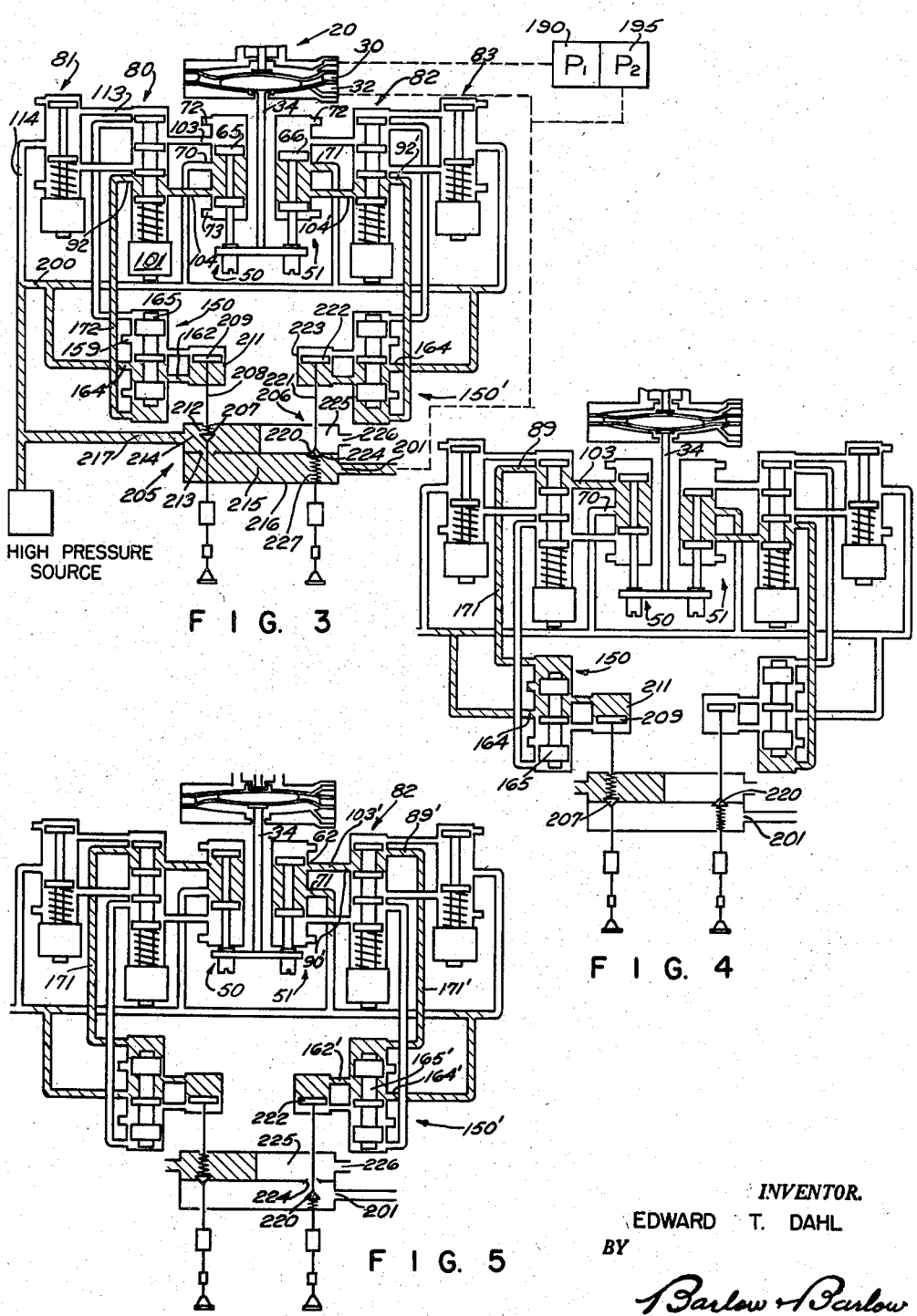

INVENTOR.
EDWARD T. DAHL
BY
Barlow & Barlow
ATTORNEYS

United States Patent Office 3,182,678
Patented May 11, 1965

3,182,678
VALVE ASSEMBLY FOR SUPPLYING AND
VENTING PRESSURE FLUID
Edward T. Dahl, Warren, R.I., assignor to George W.
Dahl Company, Inc., a corporation of Rhode Island
Continuation of application Ser. No. 81,155, Jan. 6, 1961.
This application Jan. 16, 1964, Ser. No. 339,843
9 Claims. (Cl. 137—102)

This invention relates to a valve assembly and more particularly to a pressure regulating relief and shutoff valve and is a continuation of my application Serial No. 81,155 filed January 6, 1961, now abandoned.

Frequently it is desirable to maintain a certain pressure differential between two vessels or tanks or between a varying atmospheric pressure and a tank. The valve assembly which is the subject of the instant invention senses a first pressure continuously and controls a second pressure with reference to this first pressure even though this first pressure may vary through a substantial range. Accordingly, an increase in the first pressure will open what generically might be termed a pressure regulating supply valve, thereby increasing the second pressure in the controlled tank. Conversely, a decrease in the sensed first pressure will close the regulating supply valve and open a second valve generically called a relief valve, thereby decreasing the second pressure in the controlled tank. Mathematically, the function of the valve assembly can be related by the formula $P_1-P_2=k$. The constant $k$ may have a finite numerical value or be equal to zero as is desired with regards to the end result or the use to which the valve assembly will be put.

Another requirement that is useful in many applications is that the valve assembly have a sensitivity that is very great so that when the sensed pressure is changing at a rate of approximately one pound per square inch per second, the desired pressure difference will be maintained within a very small range such as 0.5 pound per square inch.

Certain other features are also desirable in a valve assembly of this nature. For instance, the valve assembly may have several overriding features to manually change the relationships irrespective of the sensed pressures.

To accomplish some of the above general objects, several definite problems are presented since the valve assembly may very well operate in a high pressure system. When this is the case, there will be a high static pressure and, mechanically, any valve will want to stay in one position rather than move on a slight change of differential pressure. When working in high pressures with valves, even if the valves are balanced valves, problems are presented. Particularly in a pressure differential valve, if it is desired to hold the pressure within a few inches above static pressure and then follow each small change thereof, it is difficult to avoid any undershoots or overshoots. Thus the speed of response of such a valve assembly must not be measureable.

It is, therefore, the main object of the present invention to provide a valve assembly which will maintain a pressure difference between two vessels within very small limits.

Another object of the invention is to provide a valve assembly which will be sensitive to very small differences in pressure and which will control a supply and relief valve in accordance with these sensed variations.

A further object of the invention is to provide a valve assembly which will be responsive to small differences in pressure and maintain control over a rather rapid change in pressure without losing sensitivity.

A more specific object of the invention is to provide a pressure sensitive diaphragm actuator operating a pilot control valve which, in turn, through suitable means actuates balanced supply and relief valves.

With these and other objects in view, the invention consists of certain novel features of construction as will be more fully described and particularly pointed out in the appended claims.

In the accompanying drawings:

FIG. 1 is a partial sectional view taken through the body of the valve assembly to present an accurate diagrammatical picture thereof;

FIG. is a sectional view taken along line 2—2 of FIG. 1 showing the control valve assembly and its relationship to the body of the main valve; and FIGS. 3 to 8 are diagrammatic representations of the valve assembly and the operation thereof in various phases of the control that can be effected thereby.

In proceeding with this invention, I provide two ports one for the supply and one for the exhaust which are controlled by suitable mechanical actuator means such as piston means. In the particular application to be described the pressure differential to be controlled is between the atmosphere and a tank and thus the ports are controlled in a fashion whereby one effectively controls a supply of fluid to a vessel or tank, and the other controls the discharge of fluid therefrom, these ports being generally termed supply and relief ports. These ports are controlled by some means such as plug or plugs which provide control valves which are conveniently placed around the main valve casing to provide a compact package. Generally there is a source of high pressure fluid, usually air, which is directed to the vessel or tank to be controlled as pressure is needed therein. There is a main line from the pressure source to the vessel or tank, which is being controlled. The control of this main line is by means which is power operated. An exhaust or relief port for the tank or vessel may be located in the supply line between the tank and the supply control, the control means for this relief port also being power operated.

The power to operate these control means may be applied to a piston and is taken from the source of pressure fluid which supplies the tank and is divided into two branches, one of the branches leading so that it may supply the pressure fluid to one side or to the other side of the piston in order to operate the same in one direction or the other. The other branch of the pressure fluid is utilized for operating a control for directing the pressure fluid to the selected side of the piston.

The differential sensing device moves a pilot valve for directing the pressure fluid which supplies the power for the control of the direction of fluid to the piston.

In this second branch and between the pilot valve, controlled or moved by the sensing device, and the application of the pressure fluid in its controlling function, there is interposed solenoid operating valves which permit manual overriding of the automatic function of the differential sensing device. Ideally, the pressure differential sensing device includes a four-way pilot valve for controlling the main four-way control valve to provide the necessary sensitivity also alluded to above.

Figure 2:
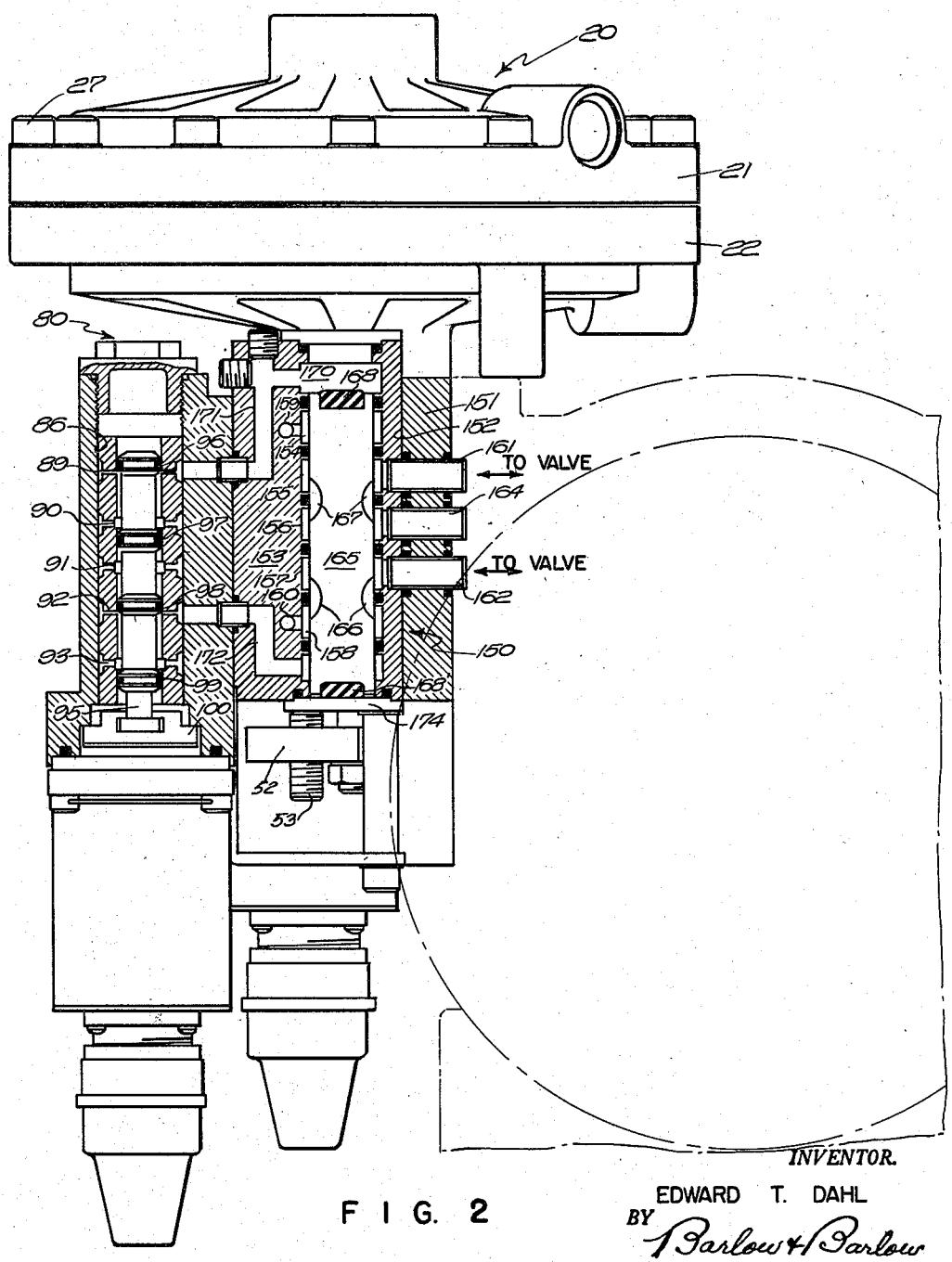

Referring now to the drawings, and particularly to FIGS. 1 and 2 which illustrate the control phase of the valve assembly, there is illustrated a pressure sensitive device indicated generally 20. The pressure sensitive device at 20 in more detail includes two symmetrical casings 21 and 22 that are formed with lateral flanges 23 and 24, respectively. A pair of diaphragms 25 and 26 are secured between the flanges by suitable means such as bolts 27. The diaphragms may be composed of any suitable flexible, gas impermeable material such as is commonly employed in the art and attached between the flanges form effectively two pressure chambers, namely, an upper chamber 28 and a lower chamber 29, to which a fluid, such as air, may be admitted to apply a variable pressure on either the upper or lower face of the diaphragms 25 and 26, respectively. The upper casing 21 is formed with a port or aperture 30 that communicates with the upper pressure chamber 28 via a passageway 31, and in a similar fashion the lower casing 22 is provided with a port 32 communicating with the lower chamber 29 via a passageway 33. The diaphragms may be connected to a diaphragm stem 34 in any suitable manner so as to impart a reciprocating motion to the latter upon applied flexure of the diaphragms. As shown the diaphragms 25, 26 are centrally apertured to receive the stem 34 and located therebetween is a diaphragm button 36, while buttons 35, 35' secure the diaphragms to button 36 and to the diaphragm stem 34. Resilient loading means in the form of springs 37 and 38 respectively abut a plate 39, that is suitably secured to the diaphragm stem 34 and the button 35'. This arrangement then permits a bias to be placed upon the diaphragms in either direction and in variable magnitude for purposes which will hereinafter appear, means being provided to adjust the pressure exerted by spring 37 as by a threaded cup 42 received in a boss on the upper casing 21 as at 43, which will, by the rotation thereof, effectively change the relative force between the two spring members 37, 38 and the direction thereof.

The diaphragm stem 34 is coupled to a pair of pilot valves generally indicated 50 and 51. To accomplish this coupling, the lower end of the stem 34 is connected to a cross member 52 which receives in threaded engagement therewith a pair of plugs 53, 54. Each of these plugs rigidly receives a connecting link 55, 56 that may be composed of stiff wire such as piano wire, and these links 55, 56 are in turn rigidly connected to valve plugs 57, 58. The plugs 57, 58 are received, respectively, in bores 59, 60 of the valves 50, 51, respectively, there being provided for communication with the bores 59, 60 ports 61, 63 and 62, 64 respectively. For cooperation with the aforementioned ports, the plugs 57, 58 are provided with piston surfaces 65, 67 and 66, 68, respectively, thus piston 65 cooperates with port 61, piston 66 cooperates with port 62, piston 67 cooperates with port 63, and piston 68 cooperates with port 64. The axial width of the pistons is such that they are wider than the width of their respective ports by a small amount and are arranged in a fashion which is termed a positive lap with respect to the port. For instance, the positive lap may be on the order of .005 inch, and the cylindrical surface of the piston is preferably honed to fit into its respective bore very closely on the order of a few micro-inches. The fit therefore is such that the pistons easily slide in the bores 59, 60 but will still only pass a bubble of air thereby at an extremely small rate, thus the static friction is very low. This feature of having a positive lap on each of the pistons controls the sensitivity of the operation of the valve assembly since the width of the positive lap is in direct proportion to this valve sensitivity figure. To complete the picture of the pilot valves 50 and 51, each of the bores 59 and 60 is provided with inlet ports 70, 71 respectively, and the ends of the bores are open as at 72 and 73. Thus, there is effectively provided, as will be apparent to those skilled in the art, a three-way pilot valve. It will further be obvious that the threaded studs 53, 54 permit synchronization of the pilot valves one to the other and also an adjustment as to the static position of the diaphragm rod 34.

The output of the pilot valves 50 and 51 is subject to modification by solenoid actuated valves. The modifying valves for the pilot valve 50 are indicated generally as 80 and 81, while the modifying valves for the pilot valve 51 are generally indicated at 82 and 83. Since the valves 80 and 82 are identical, and since the valves 81 and 83 are identical, they will be referred to by the same numerals with a prime. Turning now to the modifying valve 80, this valve consists of a body 85 having a central bore 86 therethrough into which is fitted a sleeve 87 that forms a plurality of valve ports indicated at 88 through 93 respectively. Received within the sleeve 87 is a valve plug 95 carrying four piston or sealing areas indicated at 96 through 99. The lower end of the valve plug 95 is received in a plate 100 which is part of a solenoid actuator generally indicated 101 which will, in turn, cause reciprocation of the valve plug 95 downwardly against a spring (not shown) in accordance with techniques well understood. Also, a through bore 102 is provided from one end of the plug 95 to the other to avoid air entrapment and permit free reciprocation.

The valve 80 is interconnected to the pilot valve 50 by two passageways 103 and 104 which connect, respectively, ports 90 and 61 and ports 93 and 63. Similarly, valve 82 is interconnected to pilot valve 51 over passageways 103' and 104' which connects, respectively, ports 90' and 62 and 93' and 64.

Solenoid valve 81 is made up of a body 110 which is provided with a bore 111 having a cylindrical sleeve insert 112 that carries valve ports therein. The cylindrical sleeve 112 is provided with porting as at 113, 114 and 115. Port 113 is connected via passageway 116 to port 88 of valve 80 and port 115 is connected via passageway 117 to port 91 of valve 80. Port 114 is connected via a plurality of passageways indicated 118 to a source of control pressure. Solenoid valve 81 is provided with a valve plug 120 that has two piston sealing areas as at 121 and 122 and has a lower end received in a plate 123 that is suitably connected to a solenoid generally indicated at 125 that controls the reciprocation of the plug 120 downwardly against a spring (not shown) in a manner well known to those skilled in the art. Additionally, the top of the housing 110 has secured therein a porous breathing opening protected by a porous member 126 that is secured in place by a snap ring 127, and the plug has a through bore 130 with lateral openings near the base thereof. This permits free atmospheric access to the top and bottom of the bore 111 and the proper reciprocation of the piston 120.

Referring now more particularly to FIG. 2 of the drawings, the remaining interconnections to one of the booster valves is shown, it being understood that an identical valve is connected to the valve 82 in the same fashion. The booster valve which is generally designated 150 is a four-way valve composed of a case 151 having a bore 152 into which a cylindrical sleeve 153 may be fitted. The cylindrical sleeve 153 is provided with a number of annular recesses interiorly thereof as at 154, 155, 156, 157 and 158. Recesses 154 and 158 are vented to the atmosphere as through ducting 159, 160 while recesses 155 and 157 are connected, respectively, over piping coupling connections as at 161, 162 respectively to the operating piston of one of the main valves. Recess 156 is connected via a piping coupling 164 to a supply of pilot air. Received within the bore of the cylindrical sleeve 153 is a shuttle 165 having piston end sections and two pairs of longitudinally spaced recesses 166 and 167. At either end of the shuttle 165 there is received in a recess a resilient member such as 168 and 168'. At the top of the sleeve 153, as at 170, passageway 171 leads from the port 89 of the valve 80. Similarly, piping such as 172 leads from the port 92 of the valve 80 to the lower part of the bore as at 174. Suitable sealing means are provided along the sleeve 153 between the annular recesses as indicated which may be O-rings or other suitable packing, and thus it will be apparent upon application of pressure to the piston end section at one end or the other of the shuttle a switching action will occur, connecting the pilot air supply leading to the annular recess 156, either to the piping connections 161 or to the connections 162, thus controlling a valve as will presently appear.

In the specification as far as it has proceeded, mention has been made of the fact that the valve assembly includes a pair of ports with valve plugs, one of which could be termed a supply port and its valve and the other termed a relief port and its valve together constituting a valve means. No specific structure for the control of the two ports and their operators has been described, although the above description has dealt with the control phase of the complete assembly. The supply and relief valves which have been termed to be piston actuated can in practice take several forms. For instance, it may be a diaphragm actuated valve such as shown in Patent No. 2,697,599, or it could be a positive piston type such as shown in Patent No. 3,052,444. In either case whether a diaphragm operator or straight piston operator is chosen, the valve plug itself should be of a balanced design for if this were not a prime requirement, it would be quite difficult to operate under extreme pressure conditions.

Referring now to FIGS. 3 to 8 of the drawings, there is shown diagrammatically the valve assembly which makes up this invention. A supply of control air is utilized in the system, the supply being shown leading from a high pressure source into the assembly at 200 through the over pressure control line, and it should be understood in the ensuing description that the pressure differential sensing device 20 is connected via its ports 30 and 32 to the two pressures in vessels 190, 195 which are under control and into which we want to maintain the relationship $P_1-P_2=k$. One of the port inlets 32 is connected as indicated in dotted line, to the vessel 195 to be controlled and to the line 201 while the other inlet 30 is connected to a reference source of pressure such as vessel 190. The main control means is shown in the lower portion of these drawings and consist of a valve means comprising a pair of valves generally designated at 205 and 206. Valve 205 is provided with a plug 207 that has an operating stem 208 connected to an operator herein shown as a piston 209 received within a casing 211. The valve plug 207 is adapted to cooperate with a port or seat 213. The port 213 is shown as being interposed between a pair of chambers 214 and 215 in a body 216, there being an inlet to the chamber 214 as at 217 connected to a supply of gas under high pressure. The valve 206 is similarly constructed with a plug 220 connected to an operating stem 221 that is in turn connected to a piston 222 received within a piston body 223. The plug 220 is received in a port or seat 224 that divides two chambers 225 and 215, the chamber 225 leading to an exhaust port 226. Both the valve plugs are spring loaded, the valve plug 207 being spring loaded to a normally closed position under the urgence of a spring 212, while the valve plug 220 is spring loaded to normal closed position under urgence of spring 227.

In the diagrams of FIGS. 3, 4 and 5 none of the solenoids are actuated, and each of the valve plugs in the solenoid valves 80, 81, 82 and 83 are shown in their normal rest position and maintain this rest position under the urgence of springs which have been diagrammed in each of the aforesaid valves. In FIG. 3 the port 32 of the differential pressure sensing device 20 is connected to the line 201, and the differential pressure sensing device is in a position indicating that the pressure in the line 201 is lower than it should be. Accordingly, the diaphragm stem 34 is in its down position as viewed in the drawing, and in this position the control air at 200 is led over the control air lines into each of the pilot valves 50 and 51 at 70 and 71. From the pilot valve 50 the control air is led over passageway 104 through the valve 80 and out of the port 92, thence through passageways 172 to the lower end of the booster valve 150. This forces the shuttle 165 upwardly and permits the control air to pass in through port 164 and out port 162 into the lower end of the casing 211, thus raising the piston 209 and lifting the valve plug 207 from its seat 213. Since the shuttle 165 has been raised, the recesses 167 are out of registry with the inlet 164 and no air is permitted to be passed into the upper part of the casing 211, freedom of movement of the piston 209 being insured since this part of the casing is vented to the atmosphere through port 159.

The pilot valve 51 leads the control air entering at port 71 out through passageways 104' thence through the valve 82 and out port 92' to the lower end of the booster valve 150'. This also leads the control air entering at 164' to the underside of the piston 222 which maintains the valve plug 220 against its seat 224. Accordingly, with this set of conditions high pressure air entering at 217 will pass on through the seat 213 into the chamber 215 and thence out the passageway 201 to the vessel which is under pressure control.

As soon as the pressure in the vessel has risen to the proper level, the stem 34 will raise (see FIG. 4) and will principally change the operating position of the pilot valve 50. At this point the control air entering at port 70 will now be fed out over passageway 103 into valve 80 and thence out port 89 and over through passageway 171 to the upper end of the booster 150 forcing the piston end section of the shuttle 165 in a down direction as viewed in the drawing. This now connects the supply air entering at port 164 to the upper end of the casing 211 forcing the piston 209 downwardly and closing the valve by seating the plug 207 against the seat 213. In this condition both valves are closed, and in effect the tank under control is isolated. If a too high pressure is sensed in the vessel, then the stem 34 will raise still further giving rise to the condition illustrated in FIG. 5. In this condition communication of pilot air entering the operator 50 will be maintained as in FIG. 4, but the position of the plugs in the pilot valve 51 has been changed. The change causes control air entering at port 71 to be fed out port 62 and thence through passageway 103' to enter port 90' of the valve 82. Communication is now had out through port 89' and through passageway 171' to the upper end of booster valve 150'. This forces the shuttle 165' downwardly and pilot air entering at 164' may pass out port 162' into the upper side of the piston 222, thereby causing the plug 220 to move away from its seat 224. This now permits the vessel which is connected to line 201 to be exhausted out port 226. This operation will continue until the proper pressure is reached, whereupon the situation shown in FIG. 4 will once again occur.

There are ways to overcontrol any of the usual automatic operations which render the pressure of the ratio $P_1-P_2=k$ as described in connection with FIGS. 3 to 5. Thus in FIG. 6 there is shown the manner in which the tank that is connected to the line 201 may be manually fed with the high pressure air found at the inlet port 217. To accomplish this, each of the solenoids of the valves 80, 81, 82 and 83 is energized, pulling its respective valve plug or shuttle downwardly from the normal position as viewed in the other figures of the drawings. In this situation pilot air will enter the solenoid valve 81 through port 114 and will be led out port 115 and through conduits 117 to the valve 80 entering at port 91. While the plug 95 has been pulled downwardly, it has not been pulled downwardly sufficient to close off the port 91 and communication is still had in this position out port 92 and over passageways 172 entering the booster valve 150 at the lower end thereof. This then permits the control air to enter the port 164 and pass out port 162 raising the piston 209 and lifting its plug 207 from its seat. Similarly, air enters valve 83 through port 114' and follows a similar path to the lower end of booster valve 150'. Control air enters the underside of the piston 222 and maintains its valve plug 220 in a closed position against the seat 224. Thus, high pressure air may enter at port 217 and pass on through the body 216 and out port 210 regardless of the position of the pilot valves 50 and 51. This can be readily seen by referring to the drawing since with all of the solenoids actuated and particularly the solenoids of valves 82 and 83, the output of the pilot operators 50 and 51 over passageways 103, 104 and 103′, 104′ respectively lead into blind ends in the valves 82 and 83 with no communication being had to any outlet port through the valves 82 and 83.

Figures 6, 7, 8:
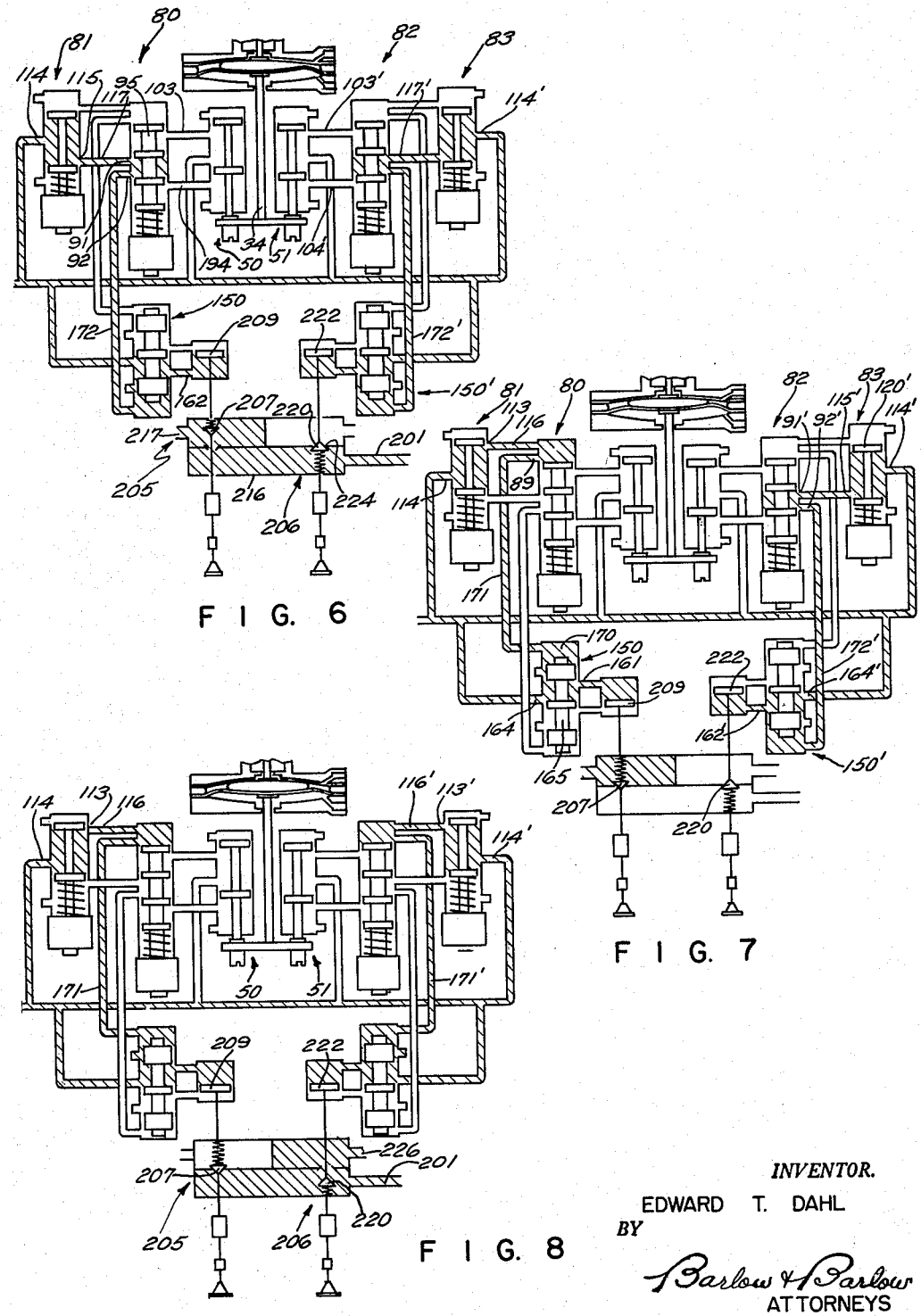

In FIG. 7 there is shown still another condition where the solenoids are over-controlling the pilot valves 50 and 51 and in this case only the solenoids of valves 80, 82 and 83 have been operated. The result here is to effectively insure that no matter which way the pilot valves operate that the valves 205 and 206 will remain closed. In this case we insure that both valves stay closed by first permitting pilot air to enter the port 114 of valve 81 and be led out port 113 through passageway 116 into valve 80 and thence out port 89 and through passageway 171 to the upper chamber 170 of the booster valve 150. This forces the shuttle 165 downwardly and pilot air entering at port 164 is permitted to pass out port 161 to the upper side of the piston 209 insuring that the valve plug 207 remains against its seat. Similarly, air entering at port 114′ of valve 83, since the piston operator 120′ is in the down position, will permit the air to be exhausted through port 115′ entering valve 82 at port 91′ and out port 92′, thence down passageway 172′ into the lower end of the booster valve 150′. This position of the booster valve 150′ permits the control air entering at 164′ to pass out port 162′ to the under side of the piston 222 insuring that the valve plug 220 remains seated.

In FIG. 8 a still further modification has been illustrated in which it is desired to completely vent the vessel connected to the line 201 and reduce the pressure therein to the same pressure as the atmosphere or to whatever the exhaust port 226 is connected. To insure that this occurs, the solenoid valves 80 and 82 are energized pulling their shuttles 95 and 95′ downwardly as viewed in the drawings. With the solenoid valves 81 and 83 not energized, pilot air now enters the ports 114 and 114′ of the valves 81 and 83, and passes respectively out of the ports 113 and 113′ through passageways 116 and 116′ into the valves 80 and 82 respectively. This pilot air is then led over passageways 171 and 171′ to the upper chambers 170 of the booster valves 150 and 150′ permitting air to enter the upper half of the piston chambers forcing both pistons 209 and 222 downwardly. The valve 205 is thus insured of remaining closed while the valve 206 will move its plug 220 from the seat, thus permitting the vessel connected to the line 201 to be exhausted to whatever pressure is present at the port 226, which is generically called an exhaust port.

Certain other modifications are of course possible in this particular arrangement as will undoubtedly be gleaned from understanding the above operations. Although not illustrated, let us assume that the solenoid valve 80 alone is energized. When this is the case, control air will be fed over the passageway 171 to the upper end of the valve 150 insuring that the high pressure air being supplied at the port 217 cannot enter the tank that is under pressure control and connected to the piping 201. However, insofar as the operation of the pilot valve 51 is concerned, nothing is preventing it from maintaining the proper pressure ratio of $P_1 - P_2 = k$. Thus, in normal automatic fashion such as described in connection with FIGS. 3 to 5, the pilot valve 51 will control the position of the valve 206. Accordingly, in such a situation with the solenoid of valve 80 only energized, any chance of the tank connected to the line 201 raising to what might be termed over pressure, through the change of temperature or the like, is prevented.

I claim:

1. In an apparatus, for maintaining the pressure as $P_1 - P_2 = k$ between two vessels, a differential pressure sensing device for connection between said vessels, a means providing a source of pressure fluid, a conduit connecting said pressure fluid to one of said vessels, valve means controlling said conduit and the exhausting of pressure fluid from said one vessel, piston means actuating said valve means, pilot valve means mechanically coupled to said sensing device, said pilot valve means being fed with said source of pressure and having an output, control valve means also fed with said source of pressure and with an output to said piston means and having a shuttle with a piston section reciprocating in a casing, the output of said pilot valve means being connected to said casing at a location to actuate said piston section and shuttle therewith whereby movement of said sensing device in one direction actuates said valve means to cause pressure fluid to be supplied to said one vessel and upon movement in the other direction causes pressure fluid to be exhausted from said one vessel.

2. An apparatus as in claim 1 wherein said shuttle has two piston sections, one at each end thereof.

3. An apparatus as in claim 1 wherein said shuttle has two piston sections therein which are moved by the fluid pressure from said source in opposite directions to select a position in response to said selecting device.

4. An apparatus as in claim 1 including a solenoid controlled valve in the pressure fluid supply normally in a position for through passage whereby direct connection is made to said piston, said solenoid valve when operated overriding the normal operation of the valve assembly.

5. A valve assembly for maintaining the pressure equation $P_1 - P_2 = k$ in a pair of vessels comprising a pressure differential sensing device connected between the vessels and including an overpressure and under-pressure control lines, means coupled to said device for feeding one of said lines with control pressure, a pair of four-way control valves, said control valves each comprising a casing, a shuttle having piston end sections reciprocating in each casing, said overpressure and under-pressure lines connected to opposite ends of each casing, a pair of piston actuated valves each having casing connections to both sides of the piston, the input of the four-way control valves being connected to a source of control pressure, the output of each one of the said four-way control valves being connected to the casing connections of one piston actuated valve, one of said piston actuated valves controlling flow from a source of gas under pressure for increasing the pressure in one of said vessels, the other piston actuated valve controlling flow from said one vessel to venting means, whereby movement of the pressure sensing device selectively actuates the overpressure or under-pressure line causing the shuttles of the four-way control valves to reciprocate and in turn control the operation of said piston actuated valves.

6. A valve assembly as in claim 5 wherein said feeding means includes two four-way pilot valves mechanically connected to the pressure differential sensing device, control pressure connected to the inputs of the four-way pilot valves, wherein said four-way pilot valves selectively feed control pressure to the overpressure and under-pressure control lines.

7. A valve assembly as in claim 6 including a pair of ganged three-way valves connected between each four-way pilot valve and the four-way control valves, said ganged three-way valves being controlled by an electric solenoid, said ganged valves normally being in a vented position whereby direct connections are made said four-way control valves, said ganged valves overriding the normal operation of the valve assembly.

8. A valve assembly for maintaining the pressure equation $P_1 - P_2 = k$ in a pair of vessels comprising a pressure differential sensing device connected between the vessels, said sensing device having a pair of pilot valves mechanically coupled thereto, said pilot valves being fed with control pressure and having two outputs, a pair of four-way control valves, said control valves comprising shuttles having piston end sections reciprocating in a casing, a pair of piston actuated valves each having casing connections to both sides of the piston, the input of the four-way control valves being connected to a source to control pressure, the output of each one of the said four-way control valves being connected to the casing connections of one piston actuated valve, one of said piston actuated valves controlling flow from a source of gas under pressure for increasing the pressure in one of said vessels, the other piston actuated valve controlling flow from said one vessel to venting means, whereby movement of the pressure sensing device selectively actuates the outputs of said pilot valves causing the shuttles of the four-way control valves to reciprocate and in turn control the operation of said piston actuated valves.

9. A valve assembly for maintaining the pressure equation $P_1-P_2=k$ in a pair of vessels comprising a pressure differential sensing device connected between the vessels, said sensing device having a pair of pilot valves mechanically coupled thereto, said pilot valves being fed with control pressure and having an output port, a pair of control valves each within a casing and each comprising a shuttle having a piston section reciprocating in said casing, the outputs of said pilot valves being connected to said casing, valve means, piston means actuating said valve means, the input of the control valves being connected to a source of control pressure, the output of each one of the said control valves being connected to the casing connections of said piston means, said valve means controlling flow from a source of gas under pressure and the flow from one vessel to venting means, whereby movement of the pressure sensing device selectively actuates the outputs of said pilot valves causing the shuttles of the control valves to reciprocate and in turn control the operation of said valve means.

References Cited by the Examiner

UNITED STATES PATENTS 2,992,302  7/61  Schuler _____ 137—102 XR

FOREIGN PATENTS 442,387  6/12  France.

M. CARY NELSON, *Primary Examiner.*

MARTIN P. SCHWADRON, *Examiner.*